United States Patent
Yu

(10) Patent No.: US 9,838,105 B2
(45) Date of Patent: Dec. 5, 2017

(54) MULTIPLE-INPUT MULTIPLE-OUTPUT MIMO DETECTION METHOD, APPARATUS, AND SYSTEMS FOR TRANSMIT SIGNAL

(71) Applicant: Huawei Technologies Co., Ltd., Shenzhen (CN)

(72) Inventor: Rongdao Yu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 102 days.

(21) Appl. No.: 14/949,559

(22) Filed: Nov. 23, 2015

(65) Prior Publication Data

US 2016/0080062 A1    Mar. 17, 2016

Related U.S. Application Data

(63) Continuation of application No. PCT/CN2014/078277, filed on May 23, 2014.

(30) Foreign Application Priority Data

May 23, 2013 (CN) .......................... 2013 1 0195170

(51) Int. Cl.
H04B 7/06 (2006.01)
H04B 7/0413 (2017.01)
H04L 5/00 (2006.01)

(52) U.S. Cl.
CPC ......... *H04B 7/0634* (2013.01); *H04B 7/0413* (2013.01); *H04L 5/0053* (2013.01)

(58) Field of Classification Search
CPC .................................................. H04B 7/0634
See application file for complete search history.

(56) References Cited

U.S. PATENT DOCUMENTS 9,059,828 B1 * 6/2015 Duarte ................. H04L 1/0054
2005/0249302 A1 * 11/2005 Leshem ................ H04L 1/0618
375/267

(Continued)

FOREIGN PATENT DOCUMENTS

CN    101127548 A    2/2008
CN    101507212 A    8/2009

(Continued)

OTHER PUBLICATIONS

Choi, R.L. et al., "Joint Transmit and Receive Multi-User MIMO Decomposition Approach for the Downlink of Multi-User MIMO Systems," 2003 IEEE 58th Vehicular Technology Conference, VTC 2003—Fall (IEEE Cat. No. 03CH37484), Oct. 6-9, 2003, pp. 409-413, vol. 1.

(Continued)

*Primary Examiner* — Andrew Lai
*Assistant Examiner* — Andrew C Lee
(74) *Attorney, Agent, or Firm* — Slater Matsil, LLP

(57) ABSTRACT

Embodiments of the present patent application relate to a MIMO detection method and apparatus for a transmit signal. The method includes removing one group of column vectors from an original channel matrix to generate a corresponding first channel matrix and multiplying a conjugate transpose matrix of a first matrix by the first channel matrix to obtain an equivalent channel matrix, and multiplying the conjugate transpose matrix of the first matrix by an original received signal vector to obtain an equivalent received signal vector. The method also includes calculating a Euclidean distance between the equivalent received signal vector and a first vector to obtain a Euclidean distance set. The method also includes obtaining a second transmit signal vector set by using the Euclidean distance set, and detecting a transmit signal vector according to the original received signal vec- (Continued)

tor, the original channel matrix, the second transmit signal vector and the second transmit signal vector set.

14 Claims, 3 Drawing Sheets

(56) References Cited

U.S. PATENT DOCUMENTS

| | | | | |
|---|---|---|---|---|
| 2007/0177688 | A1* | 8/2007 | Wu | H04B 7/0417 375/267 |
| 2008/0025443 | A1* | 1/2008 | Lee | H04B 7/0857 375/347 |
| 2008/0095275 | A1* | 4/2008 | Primo | H04L 25/03038 375/326 |
| 2008/0310556 | A1* | 12/2008 | Lee | H04L 25/067 375/340 |
| 2008/0316099 | A1 | 12/2008 | Fujii | |
| 2009/0022251 | A1 | 1/2009 | Ko et al. | |
| 2010/0086067 | A1* | 4/2010 | Oka | H04B 7/0413 375/260 |
| 2010/0232549 | A1* | 9/2010 | Oizumi | H04L 25/0204 375/341 |
| 2012/0263080 | A1* | 10/2012 | Cho | H04B 7/0434 370/310 |

FOREIGN PATENT DOCUMENTS

| | | |
|---|---|---|
| CN | 101888287 A | 11/2010 |
| JP | 2009004886 A | 1/2009 |
| JP | 2010268460 A | 11/2010 |
| WO | 2008099411 A2 | 8/2008 |

OTHER PUBLICATIONS

Lan, Yang et al., "Orthogonal Grouping-based Near Optimal Detection Algorithm for High Order MIMO Systems," IEEE, Sep. 13-16, 2009, pp. 2499-2503.

Zhou, M., et al., "Efficient and Very Low Complexity Maximum Likelihood Detector for MIMO Systems," CHina Academic Journal Electronic Publishing House, © 1994-2016, http://www.cnki.net, pp. 565-569.

* cited by examiner

CONT.
FROM
FIG. 2A

Calculate an Euclidean distance between the equivalent received signal vector and a first vector to obtain an Euclidean distance set, where the first vector is obtained by multiplying the equivalent channel matrix by a first transmit signal vector, and the first transmit signal vector is an element in a first transmit signal vector set that includes a symbol of constellation modulation performed on a transmit signal

204

Select more than one first transmit signal vector corresponding to an Euclidean distance in the Euclidean distance set, or select a first transmit signal vector corresponding to an Euclidean distance whose Euclidean distance is less than a first distance threshold, so as to constitute the first transmit signal vector set

205

After each group of column vectors is removed from the original channel matrix to generate a corresponding first channel matrix, and a corresponding first transmit signal vector set is acquired by using the first channel matrix, randomly select one vector from each first transmit signal vector set, and combine these vectors into a second transmit signal vector, so as to constitute a second transmit signal vector set, and detect a transmit signal vector according to the original received signal vector, the original channel matrix, the second transmit signal vector, and the second transmit signal vector set

MULTIPLE-INPUT MULTIPLE-OUTPUT MIMO DETECTION METHOD, APPARATUS, AND SYSTEMS FOR TRANSMIT SIGNAL

This application is a continuation of International Application No. PCT/CN2014/078277, filed on May 23, 2014 which claims priority to Chinese Patent Application No. 201310195170.5, filed on May 23, 2013, both of which are hereby incorporated by reference in their entireties.

TECHNICAL FIELD

The present patent application relates to the field of wireless communications technologies, and in particular, to a multiple-input multiple-output MIMO detection method, apparatus, and system for a transmit signal.

BACKGROUND

A multiple-input multiple-output (MIMO) technology is a hot research topic at present in the wireless communications field. The MIMO technology is used in various new mobile communications systems to increase spectrum efficiency of the systems. The MIMO technology may increase a space dimension of data multiplexing, so that a same time-frequency resource is spatially reused by multiple pieces of data; and may also use multiple transmit antennas to send same data and/or use multiple receive antennas to receive same data, so as to obtain space diversity gain. A typical space diversity technology includes Alamouti space time block code (STBC), and a typical spatial multiplexing technology includes a vertical Bell Labs layered space time (V-BLAST) technology.

FIG. 1 is a schematic diagram of an application scenario of MIMO detection. As shown in FIG. 1, a transmit end transmits a transmit signal by using a transmit antenna, and a receive end receives the signal by using a receive antenna and detects the transmit signal by using the MIMO technology, where the transmit signal may be represented by using a transmit signal vector. That is, a basic feature of the MIMO technology is multiple transmit antennas and multiple receive antennas. It is assumed that a quantity of transmit antennas is $M_T$, and a quantity of receive antennas is $M_R$, a MIMO transmission model may be represented as:

$$\underbrace{\begin{bmatrix} y_1 \\ y_2 \\ \vdots \\ y_{M_R} \end{bmatrix}}_{Y} = \underbrace{\begin{bmatrix} h_{11} & h_{12} & \cdots & h_{1M_T} \\ h_{21} & h_{22} & \cdots & h_{2M_T} \\ \vdots & \vdots & \ddots & \vdots \\ h_{M_R 1} & h_{M_R 2} & \cdots & h_{M_R M_T} \end{bmatrix}}_{H} \underbrace{\begin{bmatrix} s_1 \\ s_2 \\ \vdots \\ s_{M_T} \end{bmatrix}}_{S} + \underbrace{\begin{bmatrix} n_1 \\ n_2 \\ \vdots \\ n_{M_R} \end{bmatrix}}_{n} \quad (1)$$

or it may be briefly recorded as Y=Hs+n where $y_i$ is a signal received on the $i^{th}$ receive antenna, Y is a received signal vector that includes a received signal, $h_{ij}$ is a channel response between the $i^{th}$ receive antenna and the $j^{th}$ transmit antenna, H a channel matrix, $s_j$ is a data symbol sent on the $j^{th}$ transmit antenna, s is a transmit signal vector that includes a data symbol sent on a transmit antenna, $n_i$ is noise received on the $i^{th}$ receive antenna, and n is a noise matrix.

The transmit signal vector s may be detected by using the MIMO detection. When the quantity of receive antennas is no less than a quantity of transmit symbols, the receive end can suppress or eliminate interference among multiple transmit symbols as much as possible by using a MIMO balancing algorithm, so as to restore $M_T$ transmit symbols. A common linear MIMO balancing algorithm includes a linear minimum mean square error (LMMSE), zero forcing (ZF) and the like. In addition, the receive end may also consider all the $M_T$ transmit symbols as a complete codeword, and use a maximum likelihood detection (MLD) method to perform detection, so as to estimate the $M_T$ transmit symbols. The MIMO balancing algorithm together with successive interference cancellation (SIC) may also be used for receiving, that is, a transmit symbol thereof is estimated by using the linear MIMO balancing algorithm, and then the transmit symbol is eliminated as known interference and another transmit symbol is estimated by using the linear MIMO balancing algorithm. Sequential iteration is performed until all the transmit symbols are detected and received.

In all MIMO detection algorithms, an MLD algorithm has the best performance, but in higher order MIMO, the MLD detection algorithm has a very high complexity and is difficult to implement in a product in practice; therefore, the prior art lacks a detection method with good performance and low complexity.

SUMMARY

Embodiments of the present patent application provide a MIMO detection method, apparatus, and system for a transmit signal, which not only can reduce detection complexity, but also does not affect performance.

In a first aspect, an embodiment of the present patent application provides a MIMO detection method for a transmit signal, and the method includes acquiring, by a receiver, an original channel matrix according to a channel response between a receive antenna and a transmit antenna. The method also includes removing one group of column vectors from the original channel matrix to generate a corresponding first channel matrix. The method also includes multiplying a conjugate transpose matrix of a first matrix by the first channel matrix to obtain an equivalent channel matrix, and multiplying the conjugate transpose matrix of the first matrix by an original received signal vector to obtain an equivalent received signal vector, where the first matrix includes a singular vector corresponding to singular value 0 of a conjugate transpose matrix of the first channel matrix, and the original received signal vector is obtained by using the receive antenna. The method also includes calculating a Euclidean distance between the equivalent received signal vector and a first vector to obtain a Euclidean distance set, where the first vector is obtained by multiplying the equivalent channel matrix by a first transmit signal vector, and the first transmit signal vector is an element in a first transmit signal vector set that includes a symbol of constellation modulation performed on the transmit signal. The method also includes selecting at least one first transmit signal vector corresponding to at least one Euclidean distance in the Euclidean distance set, or selecting a first transmit signal vector corresponding to a Euclidean distance less than a first distance threshold, so as to constitute the first transmit signal vector set; and after each group of column vectors is removed from the original channel matrix to generate a corresponding first channel matrix, and a corresponding selected first transmit signal vector set is acquired by using the first channel matrix, randomly selecting one vector from each first transmit signal vector set, and combining these selected vectors into a second transmit signal vector, so as to constitute a second transmit signal vector set, and detecting a transmit signal vector according to the original received signal vector, the original channel matrix, the second transmit signal vector, and the second transmit signal vector set.

With reference to the first aspect, in a first possible implementation manner, the detecting a transmit signal vector according to the original received signal vector, the original channel matrix, the second transmit signal vector and the second transmit signal vector set specifically is: detecting the transmit signal by using a maximum likelihood estimation MLD algorithm represented by the following formula:

$$\hat{s} = \underset{s \in \Omega}{\operatorname{argmin}}(\|Y - H \cdot s\|^2),$$

where s is the second transmit signal vector, $\hat{s}$ is a value of s that enables $\|Y-H \cdot s\|^2$ to obtain a minimum value, $\Omega$ is the second transmit signal vector set, Y is the received signal vector, H is the original channel matrix.

With reference to the first aspect, in a second possible implementation manner, the first matrix is obtained by performing singular value decomposition on the conjugate transpose matrix of the first channel matrix.

With reference to the first aspect, in a third possible implementation manner, each column vector group includes a same quantity of column vectors.

In a second aspect, an embodiment of the present patent application provides a MIMO detection apparatus for a transmit signal, and the apparatus includes a receiving unit, configured to acquire, by a receiver, an original channel matrix according to a channel response between a receive antenna and a transmit antenna. The apparatus also includes a removing unit, configured to remove one group of column vectors from the original channel matrix to generate a corresponding first channel matrix. The apparatus also includes a first calculating unit, configured to multiply a conjugate transpose matrix of a first matrix by the first channel matrix to obtain an equivalent channel matrix, and multiply the conjugate transpose matrix of the first matrix by an original received signal vector to obtain an equivalent received signal vector, where the first matrix includes a singular vector corresponding to singular value 0 of a conjugate transpose matrix of the first channel matrix, and the original received signal vector is obtained by using the receive antenna. The apparatus also includes a second calculating unit, configured to calculate a Euclidean distance between the equivalent received signal vector and a first vector to obtain a Euclidean distance set, where the first vector is obtained by multiplying the equivalent channel matrix by a first transmit signal vector, and the first transmit signal vector is an element in a first transmit signal vector set that includes a symbol of constellation modulation performed on the transmit signal. The apparatus also includes a selecting unit, configured to select at least one first transmit signal vector corresponding to at least one Euclidean distance in the Euclidean distance set, or select a first transmit signal vector corresponding to a Euclidean distance less than a first distance threshold, so as to constitute the first transmit signal vector set. The apparatus also includes a detecting unit, configure to: after each group of column vectors is removed from the original channel matrix to generate a corresponding first channel matrix, and a corresponding selected first transmit signal vector set is acquired by using the first channel matrix, randomly select one vector from each first transmit signal vector set, and combine these selected vectors into a second transmit signal vector, so as to constitute a second transmit signal vector set, and detect a transmit signal vector according to the original received signal vector, the original channel matrix, the second transmit signal vector, and the second transmit signal vector set.

With reference to the second aspect, in a first possible implementation manner, the detecting unit is specifically configure to detect the transmit signal by using a maximum likelihood estimation MLD algorithm represented by the following formula:

$$\hat{s} = \underset{s \in \Omega}{\operatorname{argmin}}(\|Y - H \cdot s\|^2),$$

where s is the second transmit signal vector, $\hat{s}$ is a value of s that enables $\|Y-H \cdot s\|^2$ to obtain a minimum value, $\Omega$ is the second transmit signal vector set, Y is the received signal vector, H is the original channel matrix.

With reference to the second aspect, in a second possible implementation manner, the first calculating unit performs singular value decomposition on the conjugate transpose matrix of the first channel matrix to obtain the first matrix.

With reference to the second aspect, in a third possible implementation manner, each column vector group that is removed by the removing unit includes a same quantity of column vectors.

In a third aspect, an embodiment of the present patent application provides a MIMO detection system for a transmit signal, including a receive antenna and a detection apparatus provided in the second aspect, where the receive antenna is configured to acquire a received signal, the detection apparatus is configured to perform processing on the received signal to obtain the transmit signal.

In the embodiments of the present patent application, an original channel matrix is acquired by using a receiver according to a channel response between a receive antenna and a transmit antenna. One group of column vectors is removed from the original channel matrix to generate a corresponding first channel matrix. A conjugate transpose matrix of a first matrix is multiplied by the first channel matrix to obtain an equivalent channel matrix, and the conjugate transpose matrix of the first matrix is multiplied by an original received signal vector to obtain an equivalent received signal vector, where the first matrix includes a singular vector corresponding to singular value 0 of a conjugate transpose matrix of the first channel matrix, and the original received signal vector is obtained by using the receive antenna. A Euclidean distance between the equivalent received signal vector and a first vector is calculated, and a Euclidean distance set is obtained, where the first vector is obtained by multiplying the equivalent channel matrix by a first transmit signal vector, and the first transmit signal vector is an element in a first transmit signal vector set that includes a symbol of constellation modulation performed on a transmit signal. At least one first transmit signal vector corresponding to at least one Euclidean distance in the Euclidean distance set is selected, or a first transmit signal vector corresponding to a Euclidean distance less than a first distance threshold is selected, so as to constitute the first transmit signal vector set. After each group of column vectors is removed from the original channel matrix to generate a corresponding first channel matrix, and a corresponding selected first transmit signal vector set is acquired by using the first channel matrix, one vector is randomly selected from each first transmit signal vector set. These selected vectors are combined into a second transmit signal vector, so as to constitute a second transmit signal vector set. A transmit signal vector is detected according to the original received signal vector, the original channel matrix, the second transmit signal vector, and the second transmit signal vector set. By using the foregoing method, a computation complexity (a quantity of search times) is: $NQ^{M_T/N}+K^N$ (N is a quantity of column vector groups of the original channel matrix, Q is a quantity of constellation points, K is a quantity of vectors in each first transmit signal vector set, $M_T$ is a quantity of transmit antennas), while an existing computation complexity required for directly using an MLD algorithm is $Q^{M_T}$. It can be seen that the computation complexity required by the method provided in this embodiment of the present patent application is greatly reduced compared with that of the existing algorithm.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A and FIG. 2B are a flowchart of a MIMO detection method for a transmit signal according to Embodiment 1 of the present patent application.

DETAILED DESCRIPTION OF ILLUSTRATIVE EMBODIMENTS

To make the objectives, technical solutions, and advantages of the present patent application clearer, the following further describes the embodiments of the present patent application in detail with reference to the accompanying drawings.

In view of a defect in the prior art, embodiments of the present patent application propose a MIMO detection method and apparatus for a transmit signal. Multiple independent equations are obtained by dividing a channel matrix into groups, and each independent equation is independently solved. Then, several optimal solutions are kept for each equation, all the optimal solutions are combined as a value space of a transmit signal vector, and the transmit signal vector is detected from the value space. Detection complexity is reduced by at least one order of magnitude without deteriorating the performance.

It should be noted that the method and apparatus provided in the embodiments of the present patent application are applicable to all MINO cases, and a receiver may be a mobile phone or may be another terminal.

Figure 1:
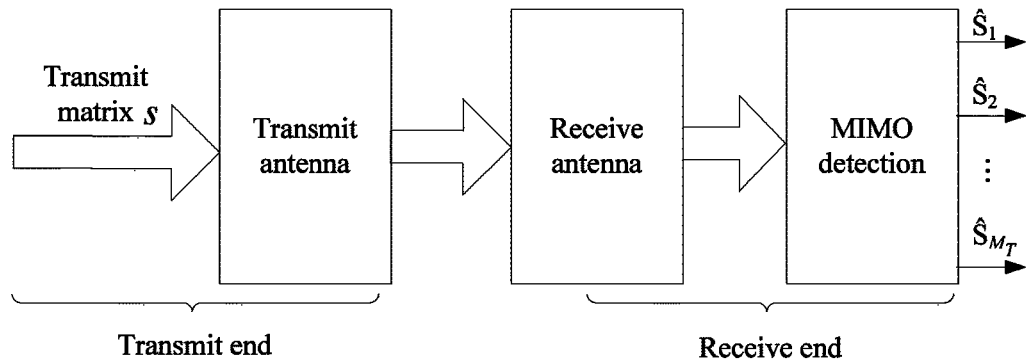
FIG. 1 is a schematic diagram of an application scenario of MIMO detection.
Figure 2A:
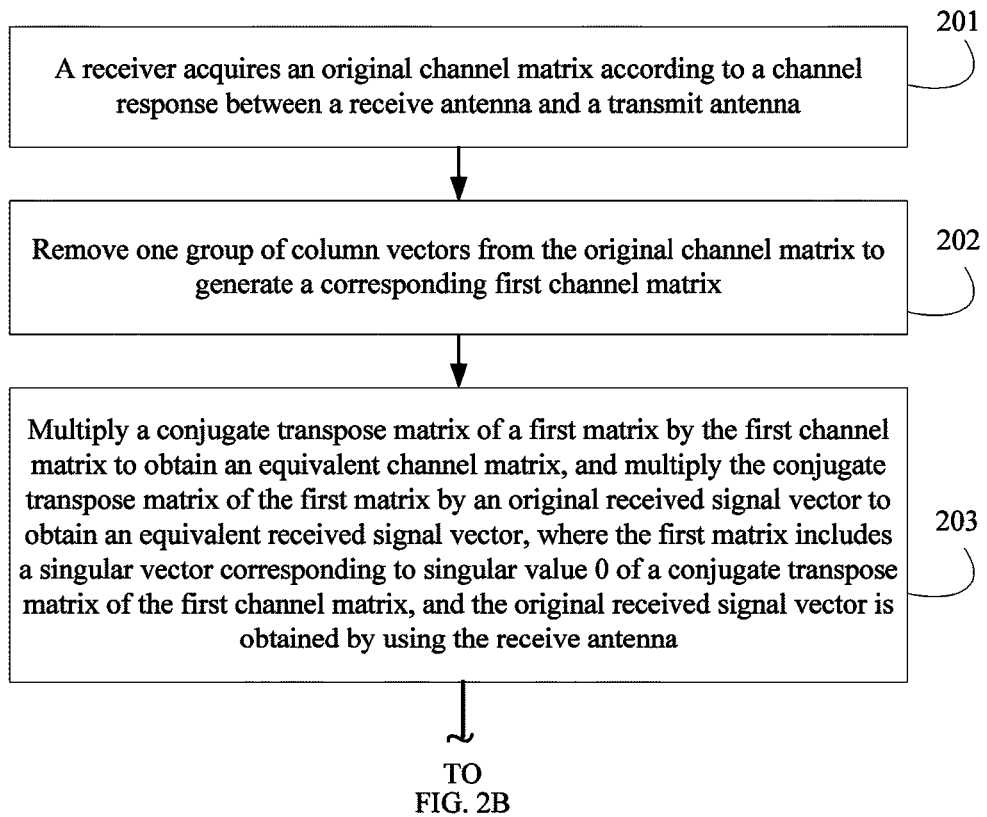

The following embodiment describes a MIMO detection method for a transmit signal. FIG. 2A and FIG. 2B are a flowchart of a MIMO detection method for a transmit signal according to Embodiment 1 of the present patent application. As shown in FIG. 2A and FIG. 2B, the method includes the following steps.

S201. A receiver acquires an original channel matrix according to a channel response between a receive antenna and a transmit antenna.

S202. Remove one group of column vectors from the original channel matrix to generate a corresponding first channel matrix.

Specifically, one group of column vectors may be removed from the original channel matrix to generate the first channel matrix, where the one group of column vectors includes at least one consecutive column vector.

To facilitate operation, before this step, the original channel matrix may first be divided into groups by column, and then one of the column vector groups is removed. Each column vector group may include a same quantity or different quantities of column vectors. Specifically, according to a MIMO transmission model shown in formula (1), the original channel matrix H may be represented by N column vector groups:

$$H = \begin{bmatrix} h_{11} & h_{12} & \ldots & h_{1M_T} \\ h_{21} & h_{22} & \ldots & h_{2M_T} \\ \vdots & \vdots & \ddots & \vdots \\ h_{M_R1} & h_{M_R2} & \ldots & h_{M_RM_T} \end{bmatrix} = [H_1 \ldots H_i \ldots H_N] \quad (2)$$

Each column vector group $H_i$ includes at least one column vector. The first channel matrix may be generated after one group of column vectors is removed from the original channel matrix, where the first channel matrix may be represented as:

$$\tilde{H}_i = [H_1, \ldots H_{i-1}H_{i+1} \ldots H_N] \quad (3)$$

where $1 \le i \le M_T$, that is, $\tilde{H}_i$ indicates removing of the $i^{th}$ column vector group $H_i$ from H; $M_T$ is a quantity of transmit antennas, that is, a quantity of column vectors included in H; $M_R$ is a quantity of receive antennas, that is, a quantity of row vectors included in H.

S203. Multiply a conjugate transpose matrix of a first matrix by the first channel matrix to obtain an equivalent channel matrix, and multiplying the conjugate transpose matrix of the first matrix by an original received signal vector to obtain an equivalent received signal vector, where the first matrix includes a singular vector corresponding to singular value 0 of a conjugate transpose matrix of the first channel matrix, and the original received signal vector is obtained by using the receive antenna.

Specifically, the first matrix that includes a vector corresponding to the singular value 0 of conjugate transpose matrix $\tilde{H}_i^H$ of first channel matrix $\tilde{H}_i$ may be solved by using a singular value decomposition method, or the first matrix may be acquired by using another method. The singular value decomposition is a known matrix decomposition method and is not described in detail but only briefly introduced herein, and singular value decomposition may be performed on matrix $\tilde{H}_i^H$:

$$\tilde{H}_i^H = U_i \begin{bmatrix} \Sigma_i & 0 \\ 0 & 0 \end{bmatrix} [V_i^1 \ V_i^0]^H \quad (4)$$

where $V_i^0$ is a matrix corresponding to the singular value 0 of $\tilde{H}_i^H$ and is referred to as the first matrix herein. In addition, it can be learned according to a feature of the singular value decomposition of a linear theory that:

$$\tilde{H}_i^H V_i^0 = 0 \quad (5)$$

For ease of description, let $W_i = V_i^0$, then:

$$\tilde{H}_i^H W_i = 0 \quad (6)$$

It may be obtained by performing conjugate processing on formula (6) that:

$$W_i^H \tilde{H}_i = 0 \quad (7)$$

It can be learned according to formula (7) that the conjugate transpose matrix of the first matrix is multiplied by the original channel matrix as follows:

$$W_i^H [H_1 \ldots H_{i-1}\ H_i\ H_{i+1} \ldots H_N] = W_i^H H_i \quad (8)$$

$$= \hat{H}_i$$

where $\hat{H}_i = W_i^H H_i$ is referred to as the equivalent channel matrix.

The conjugate transpose matrix of the first matrix is multiplied by a received signal vector as follows:

$$W_i^H Y = r_i \quad (9)$$

where Y is the received signal vector corresponding to a received signal, and $r_i$ is the equivalent channel matrix.

S204. Calculate a Euclidean distance between the equivalent received signal vector and a first vector to obtain a Euclidean distance set, where the first vector is obtained by multiplying the equivalent channel matrix by a first transmit signal vector, and the first transmit signal vector is an element in a first transmit signal vector set that includes a symbol of constellation modulation performed on a transmit signal.

Both sides of the MIMO transmission model shown in formula (1) are multiplied by the matrix $W_i^H$, to obtain:

$$W_i^H Y = W_i^H (Hs + n) \quad (10)$$

$$= W_i^H ([H_1 \ldots H_{i-1}\ H_i\ H_{i+1} \ldots H_N]s + n)$$

where the transmit signal vector s is divided, according to a same grouping method as that is performed on the original channel matrix H, into the following forms: $s = [S_1 \ldots S_i \ldots S_N]^T$, if s is a vector, $S_i$ is a piece of data.

It should be noted that the original channel matrix H is corresponding to the transmit signal vector s. Therefore, when the transmit signal vector s is divided into groups, the same grouping method performed on the original channel matrix needs to be used, so that a correspondence is kept unchanged after grouping.

Formula (8) and formula (9) are substituted into formula (10) to obtain:

$$r_i = W_i^H H_i S_i + W_i^H n \quad (11)$$

$$= \hat{H}_i S_i + \hat{n}$$

where $\hat{n} = W_i^H n$ is an equivalent noise vector.

It can be learned from formula (12) that solving the formula (1) may be converted into solving the following N independent equations:

$$r_i = \hat{H}_i S_i + \hat{n}, i=1,2,\ldots,N \quad (12)$$

For each equation, the Euclidean distance between the equivalent received signal vector and the first vector is calculated according to a quantity Q of constellation points of the constellation modulation performed on the transmit signal. It is assumed that a quantity of elements in $S_i$ is $n_i$, because the quantity of constellation points is Q, $S_i$ has $Q^{n_i}$ types of values and $S_i$ may be recorded as:

$$S_i = S_{i,j} = [S_1^{i,j}, \ldots, S_{n_1}^{i,j}]^T, j=1,2,\ldots,Q^{n_i} \quad (13)$$

A matrix obtained by multiplying the equivalent channel matrix by the first transmit signal vector is referred to as the first vector, and the Euclidean distance between the equivalent received signal vector and the first vector is calculated by using the foregoing formula as follows:

$$e_j = |r_i - \hat{H}_i \cdot S_{i,j}|^2, j=1,2,\ldots,Q^{n_i} \quad (14)$$

The Euclidean distance set $e = \{e_1, \ldots, e_j, \ldots, e_{n_1}\}$ may be obtained by using formula (14).

S205. Select at least one first transmit signal vector corresponding to at least one Euclidean distance in the Euclidean distance set, or select a first transmit signal vector corresponding to a Euclidean distance less than a first distance threshold, so as to constitute the first transmit signal vector set.

Specifically, each Euclidean distance $e_j$ is corresponding to a $S_{i,j}$. Therefore, several Euclidean distances may be selected from the Euclidean distance set according to an actual requirement, and a corresponding quantity of $S_{i,j}$ is selected according to a correspondence between a Euclidean distance and $S_i$ to constitute the first transmit signal vector set $\Omega_i$.

S206. After each group of column vectors is removed from the original channel matrix to generate a corresponding first channel matrix, and a corresponding selected first transmit signal vector set is acquired by using the first channel matrix, randomly select one vector from each first transmit signal vector set, and combine these selected vectors into a second transmit signal vector, so as to constitute a second transmit signal vector set, and detect a transmit signal vector according to the original received signal vector, the original channel matrix, the second transmit signal vector, and the second transmit signal vector set.

Specifically, if the original channel matrix is divided into N column vector groups, one different vector group is removed from the original channel matrix each time S202 is performed, and one first channel matrix is obtained. One corresponding selected first transmit signal vector set is obtained each time S203-S205 are performed, that is, N first transmit signal vector sets are obtained when S202-S205 are performed for N times. Vectors in each first transmit signal vector set are a complete row vector set of a transmit signal matrix. Therefore, a complete transmit signal may be formed only by selecting one vector from each first transmit signal vector set and combining these selected vectors together, that is, a second transmit signal vector set is obtained according to the N first transmit signal vector sets:

$$\Omega = \{\Omega_1 \cup \Omega_2 \cup \ldots \Omega_i \cup \ldots \Omega_N\} \quad (15)$$

Therefore, this set may be used to perform an MLD method on the MIMO model in formula (1) to detect an original transmission signal vector (or the original transmit signal vector may be detected by using another method). An MLD algorithm is:

$$\hat{s} = \underset{s \in \Omega}{\operatorname{argmin}}(\|Y - H \cdot s\|^2) \quad (16)$$

where ŝ calculated by using the foregoing formula is a value of s that enables $\|Y-H \cdot s\|^2$ to obtain a minimum value; ŝ is an estimate value or a detection value of s.

The following compares computation complexity and performance of the method provided in the embodiment with that of the existing MLD algorithm.

If the original channel matrix is equally divided into N groups in S201, that is, each group includes $M^T/N$ column vectors, and each time S205 is performed, K first transmit signal vectors in the Euclidean distance set are selected to constitute the first transmit signal vector set $\Omega_i$, then a computation complexity of detecting the original channel matrix by using the technical solutions provided in the embodiment of the present patent application is: a quantity of times of searching $S_{i,j}$ when calculating the Euclidean distance in S204 is $Q^{M^T/N}$. Because S204 needs to be performed for N times, a quantity of search times is $NQ^{M^T/N}$. In addition, a required quantity of times of searching $S_{i,j}$ when performing S206 is $K^N$. Therefore, a total quantity of search times is $NQ^{M^T/N}+K^N$.

Specifically, if quadrature phase shift keying (Quadrature Phase Shift Keying, QPSK) modulation is used, there are four constellation points, and 4×4, 8×8, 16×16 antennas are configured, the computation complexity of the existing MLD algorithm and the algorithm provided in the embodiment of the present patent application is shown in table 1:

TABLE 1

Comparison of complexity of different algorithms

| Algorithm | Antenna 4 × 4 | 8 × 8 Complexity | 16 × 16 |
|---|---|---|---|
| Existing MLD algorithm | 256 | 65336 | 4.2950e+009 |
| Method of the present application (N = 2, K = 4) | 48 | 528 | 131088 |
| Method of the present application (N = 2, K = 8) | 96 | 576 | 131136 |

As shown in the second column of Table 1, when eight transmit antennas and eight receive antennas are configured, a required quantity of search times is 65536 for the existing MLD algorithm, but in the present patent application, when N=2, K=4, the required quantity of search times is 528, and the complexity thereof is 528/65536=8.1e-3 times that of the MLD, that is, three orders of magnitude are reduced compared with the MLD. In the present patent application, when N=2,K=8, the required quantity of search times is 576, and the complexity thereof is 576/65536=8.8e-3 times that of the MLD, that is, three orders of magnitude are reduced compared with the MLD. When 16 transmit antennas and 16 receive antennas are configured, the complexity of the present patent application is reduced by five orders of magnitude compared with the complexity of the MLD. In conclusion, higher antenna configuration indicates lower complexity of the present patent application compared with that of the MLD.

Figure 3:
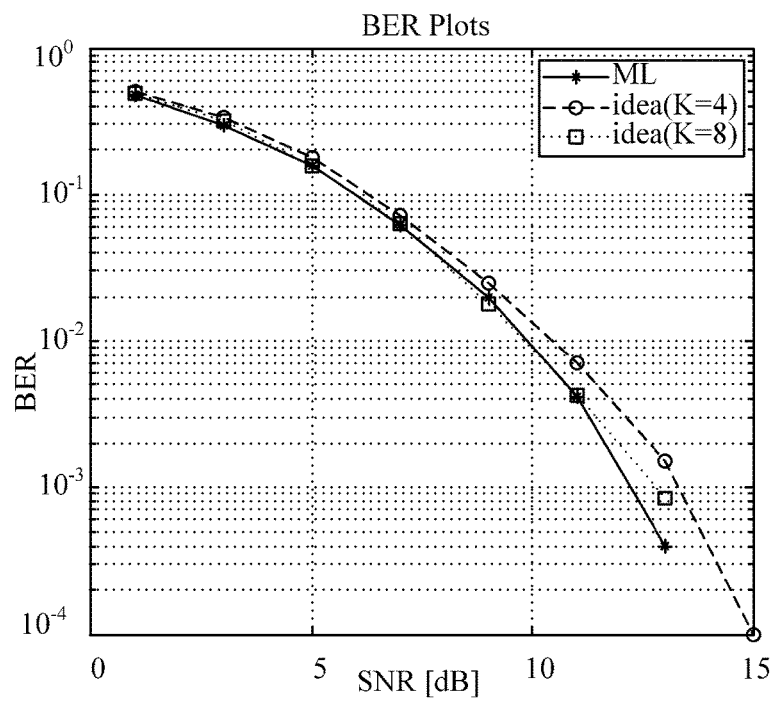
FIG. 3 is a comparison diagram of performance of different algorithms according to Embodiment 1 of the present patent application.

FIG. 3 is a comparison diagram of performance of different algorithms according to Embodiment 1 of the present patent application. An emulation condition of FIG. 3 is that: QPSK modulation is used, there are four constellation points, and the antenna configuration is 4×4. The vertical axis represents a bit error rate (Bit error ratio, BER), and the horizontal axis represents a signal-to-noise ratio (Signal Noise Ratio, SNR). A larger BER corresponding to a same SNR indicates worse performance. In the diagram, the curve with asterisks is a performance curve of the existing MLD algorithm, and the curve with circles is a performance curve of the present patent application when N=2, K=8, and it can be seen that this curve is basically coincidence with the performance curve of the existing MLD algorithm. However, under a same condition, it can be seen from the foregoing table, the complexity of the present application when N=2, K=8 is reduced by three orders of magnitude compared with that of the MLD method. The curve with squares is a performance curve of the present patent application when N=2, K=4. When the BER is 1e-2, compared with the MLD, 0.3 dB difference exists, which is a slight difference. Compared with the existing MLD algorithm, the complexity of the present application when N=2, K=4 is lower than that when N=2, K=8.

Therefore, it can be learned from the foregoing analysis and comparison that the complexity of the method provided in the embodiment of the present patent application is greatly reduced compared with that of the existing MLD detection algorithm, the performance has a slight difference from that of the existing MLD algorithm.

What the foregoing embodiment describes is as follows: An original channel matrix is acquired by using a receiver according to a channel response between a receive antenna and a transmit antenna. One group of column vectors is removed from the original channel matrix to generate a corresponding first channel matrix; a conjugate transpose matrix of a first matrix is multiplied by the first channel matrix to obtain an equivalent channel matrix, and the conjugate transpose matrix of the first matrix is multiplied by an original received signal vector to obtain an equivalent received signal vector. A Euclidean distance between the equivalent received signal vector and a first vector is calculated, and a Euclidean distance set is obtained. At least one first transmit signal vector corresponding to at least one Euclidean distance in the Euclidean distance set is selected, or a first transmit signal vector corresponding to a Euclidean distance less than a first distance threshold is selected, so as to constitute a first transmit signal vector set. After each group of column vectors is removed from the original channel matrix to generate a corresponding first channel matrix, and a corresponding selected first transmit signal vector set is acquired by using the first channel matrix, one vector is randomly selected from each first transmit signal vector set, and these selected vectors are combined into a second transmit signal vector, so as to constitute a second transmit signal vector set. A transmit signal vector is detected according to the original received signal vector, the original channel matrix, the second transmit signal vector, and the second transmit signal vector set. By using the foregoing method, a computation complexity (a quantity of search times) is: $NQ^{M^T/N}+K^N$ (N is a quantity of column vector groups of the original channel matrix, Q is a quantity of constellation points, K is a quantity of vectors in each first transmit signal vector set, $M_T$ is a quantity of transmit antennas), while an existing computation complexity required for a solution that directly uses an MLD algorithm is $Q^{M^T}$. It can be seen that the computation complexity required by the method provided in this embodiment of the present patent application is greatly reduced compared with that of the existing algorithm.

Figure 4:
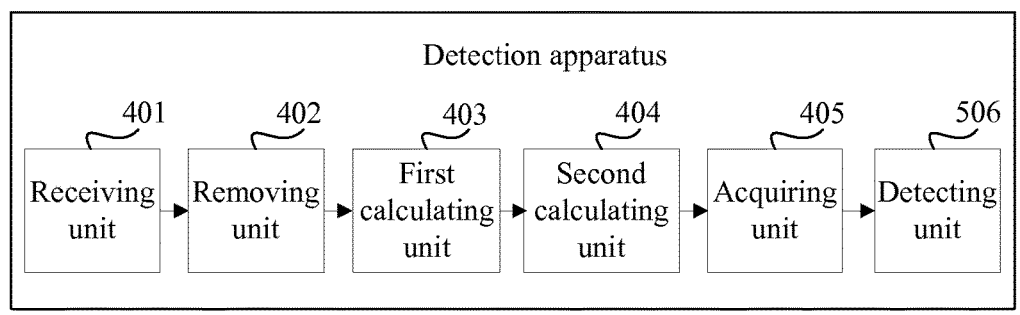
FIG. 4 illustrates a MIMO detection apparatus for a transmit signal according to Embodiment 2 of the present patent application.

Correspondingly, an embodiment of the present patent application further provides a detection apparatus corresponding to the foregoing method. FIG. 4 is a flowchart of a MIMO detection apparatus for a transmit signal according to Embodiment 2 of the present patent application. As shown in FIG. 4, the apparatus includes: a receiving unit 401, a removing unit 402, a first calculating unit 403, a second calculating unit 404, a selecting unit 405 and a detecting unit 406.

The receiving unit 401 is configured to acquire, by a receiver, an original channel matrix according to a channel response between a receive antenna and a transmit antenna.

The removing unit 402 is configured to remove one group of column vectors from the original channel matrix to generate a corresponding first channel matrix.

The first calculating unit 403 is configured to multiply a conjugate transpose matrix of a first matrix by the first channel matrix to obtain an equivalent channel matrix, and multiply the conjugate transpose matrix of the first matrix by an original received signal vector to obtain an equivalent received signal vector, where the first matrix includes a singular vector corresponding to singular value 0 of a conjugate transpose matrix of the first channel matrix, and the original received signal vector is obtained by using the receive antenna.

The second calculating unit 404 is configured to calculate a Euclidean distance between the equivalent received signal vector and a first vector to obtain a Euclidean distance set, where the first vector is obtained by multiplying the equivalent channel matrix by a first transmit signal vector, and the first transmit signal vector is an element in a first transmit signal vector set that includes a symbol of constellation modulation performed on the transmit signal.

The selecting unit 405 is configured to select at least one first transmit signal vector corresponding to at least one Euclidean distance in the Euclidean distance set, or select a first transmit signal vector corresponding to a Euclidean distance less than a first distance threshold, so as to constitute the first transmit signal vector set.

The detecting unit 406 is configured to: after each group of column vectors is removed from the original channel matrix to generate a corresponding first channel matrix, and a corresponding selected first transmit signal vector set is acquired by using the first channel matrix, randomly select one vector from each first transmit signal vector set, and combine these selected vectors into a second transmit signal vector, so as to constitute a second transmit signal vector set, and detect a transmit signal vector according to the original received signal vector, the original channel matrix, the second transmit signal vector, and the second transmit signal vector set.

The detecting unit 406 is specifically configured to detect the transmit signal by using a maximum likelihood estimation MLD algorithm represented by the following formula:

$$\hat{s} = \underset{s \in \Omega}{\operatorname{argmin}}(\|Y - H \cdot s\|^2),$$

where s is the second transmit signal vector, $\hat{s}$ is a value of s that enables $\|Y - H \cdot s\|^2$ to obtain a minimum value, $\Omega$ is the second transmit signal vector set, Y is the received signal vector, H is the original channel matrix.

The first calculating unit 403 performs singular value decomposition on the conjugate transpose matrix of the first channel matrix to obtain the first matrix.

Each column vector group that is removed by the removing unit 402 includes a same quantity of column vectors.

It should be noted that the detection method provided in Embodiment 1 is embedded into the detection apparatus provided in the embodiment of the present patent application. Therefore, a detailed working process of each unit in the detection apparatus is not repeatedly described herein.

What the foregoing embodiment describes is as follows: An original channel matrix is acquired by using a receiver according to a channel response between a receive antenna and a transmit antenna. One group of column vectors is removed from the original channel matrix to generate a corresponding first channel matrix. A conjugate transpose matrix of a first matrix is multiplied by the first channel matrix to obtain an equivalent channel matrix, and the conjugate transpose matrix of the first matrix is multiplied by an original received signal vector to obtain an equivalent received signal vector. A Euclidean distance between the equivalent received signal vector and a first vector is calculated, and a Euclidean distance set is obtained. At least one first transmit signal vector corresponding to at least one Euclidean distance in the Euclidean distance set is selected, or a first transmit signal vector corresponding to a Euclidean distance less than a first distance threshold is selected, so as to constitute a first transmit signal vector set. After each group of column vectors is removed from the original channel matrix to generate a corresponding first channel matrix, and a corresponding selected first transmit signal vector set is acquired by using the first channel matrix, one vector is randomly selected from each first transmit signal vector set, and these selected vectors are combined into a second transmit signal vector, so as to constitute a second transmit signal vector set. A transmit signal vector is detected according to the original received signal vector, the original channel matrix, the second transmit signal vector, and the second transmit signal vector set. By using the foregoing method, a computation complexity (a quantity of search times) is: $NQ^{M_T/N} + K^N$ (N is a quantity of column vector groups of the original channel matrix, Q is a quantity of constellation points, K is a quantity of vectors in each first transmit signal vector set, $M_T$ is a quantity of transmit antennas), while an existing computation complexity required for directly using an MLD algorithm is $Q^{M_T}$. It can be seen that the computation complexity required by the method provided in this embodiment of the present patent application is greatly reduced compared with that of the existing algorithm.

An embodiment of the present patent application further provides a MIMO detection system for a transmit signal, including a receive antenna and a detection apparatus provided in Embodiment 2, where the receive antenna is configured to acquire a received signal, the detection apparatus is configured to perform processing on the received signal and obtain the transmit signal.

It should be noted that a detailed working process of an apparatus of the MIMO detection system are provided in Embodiment 2, and details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present patent application.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present patent application are further described in detail. It should be understood that the foregoing descriptions are merely specific implementation manners of the present patent application, but are not intended to limit the protection scope of the present patent application. Any modification, equivalent replacement, or improvement made without departing from the spirit and principle of the present patent application should fall within the protection scope of the present patent application.

What is claimed is:

1. A method comprising:
   receiving, by a terminal, an original received signal, wherein the original received signal is represented using a original received signal vector;
   acquiring, by the terminal, an original channel matrix according to a channel response between a receive antenna and a transmit antenna;
   removing, by the terminal, one group of column vectors from the original channel matrix to generate a corresponding first channel matrix;
   multiplying, by the terminal, a conjugate transpose matrix of a first matrix by the first channel matrix to obtain an equivalent channel matrix, and multiplying the conjugate transpose matrix of the first matrix by the original received signal vector to obtain an equivalent received signal vector, wherein the first matrix comprises a singular vector corresponding to singular value o of a conjugate transpose matrix of the first channel matrix, and the original received signal vector is obtained by using the receive antenna;
   calculating, by the terminal, a Euclidean distance between the equivalent received signal vector and a first vector to obtain a Euclidean distance set, wherein the first vector is obtained by multiplying the equivalent channel matrix by a first transmit signal vector, and the first transmit signal vector is an element in a first transmit signal vector set that comprises a symbol of constellation modulation performed on a transmit signal;
   selecting, by the terminal, a first transmit signal vector corresponding to a Euclidean distance in the Euclidean distance set; and
   after each group of column vectors is removed from the original channel matrix to generate a corresponding first channel matrix, acquiring, by the terminal, a first transmit signal vector set using the first channel matrix, combining, by the terminal, a selected first transmit signal vector from the first transmit signal vector set into a second transmit signal vector, so as to constitute a second transmit signal vector set, and detecting, by the terminal, a transmit signal vector according to the original received signal vector, the original channel matrix, and the second transmit signal vector set.

2. The method according to claim 1, wherein the Euclidean distance is a Euclidean distance less than a first distance threshold.

3. The method according to claim 1, further comprising:
   selecting, by the terminal, a second first transmit signal vector, the first transmit signal vector and the second first transmit signal vector constituting the first transmit signal vector set;
   wherein the selected first transmit signal vector from the first transmit signal vector set is selected at random; and
   wherein the second transmit signal vector includes the randomly selected vector.

4. The method according to claim 1, further comprising:
   detecting, by the terminal, the transmit signal by using a maximum likelihood estimation MLD algorithm represented by the following formula:

$$\hat{s} = \underset{s \in \Omega}{\mathrm{argmin}}(\|Y - H \cdot s\|^2),$$

wherein s is the second transmit signal vector, ŝ is a value of s that enables $\|Y-H\cdot\|^2$ to obtain a minimum value, Ω is the second transmit signal vector set, Y is the received signal vector, H is the original channel matrix.

5. The method according to claim 1, wherein the first matrix is obtained by performing, by the terminal, singular value decomposition on the conjugate transpose matrix of the first channel matrix.

6. The method according to claim 1, wherein each column vector group comprises a same quantity of column vectors.

7. An apparatus comprising:
   a receiver, configured to receive an original signal;
   a processor;
   a non-transitory computer-readable storage medium storing a program to be executed by the processor, the program including instructions for:
      acquiring an original channel matrix according to a channel response between a receive antenna and a transmit antenna;
      removing one group of column vectors from the original channel matrix to generate a corresponding first channel matrix;
      multiplying a conjugate transpose matrix of a first matrix by the first channel matrix to obtain an equivalent channel matrix, and multiplying the conjugate transpose matrix of the first matrix by the original received signal vector to obtain an equivalent received signal vector, wherein the first matrix comprises a singular vector corresponding to singular value o of a conjugate transpose matrix of the first channel matrix, and the original received signal vector is obtained by using the receive antenna;
      calculating a Euclidean distance between the equivalent received signal vector and a first vector to obtain a Euclidean distance set, wherein the first vector is obtained by multiplying the equivalent channel matrix by a first transmit signal vector, and the first transmit signal vector is an element in a first transmit signal vector set that comprises a symbol of constellation modulation performed on a transmit signal;
      selecting at least one first transmit signal vector corresponding to at least one Euclidean distance in the Euclidean distance set, or selecting a first transmit signal vector corresponding to a Euclidean distance less than a first distance threshold, so as to constitute a selected first transmit signal vector set; and
      randomly selecting, after each group of column vectors is removed from the original channel matrix to generate a corresponding first channel matrix, and a corresponding selected first transmit signal vector set is acquired by using the first channel matrix, one vector from each first transmit signal vector set, and combining these selected vectors into a second transmit signal vector, so as to constitute a second transmit signal vector set, and detecting a transmit signal vector according to the original received signal vector, the original channel matrix, and the second transmit signal vector set.

8. The apparatus according to claim 7, wherein the program further includes instructions for detecting the transmit signal using a maximum likelihood estimation MLD algorithm represented by the following formula:

$$\hat{s} = \underset{s \in \Omega}{\operatorname{argmin}}(\|Y - H \cdot s\|^2),$$

wherein s is the second transmit signal vector, ŝ is a value of s that enables $\|Y-H \cdot s\|^2$ to obtain a minimum value, $\Omega$ is the second transmit signal vector set, Y is the received signal vector, H is the original channel matrix.

9. The apparatus according to claim 7, wherein the program further includes instructions for performing singular value decomposition on the conjugate transpose matrix of the first channel matrix to obtain the first matrix.

10. The apparatus according to claim 7, wherein each column vector group that is removed by comprises a same quantity of column vectors.

11. A system, comprising a receive antenna and a detection apparatus, wherein the detection apparatus comprises:
a processor;
a non-transitory computer-readable storage medium storing a program to be executed by the processor, the program including instructions for:
  acquiring an original channel matrix according to a channel response between the receive antenna and a transmit antenna;
  removing one group of column vectors from the original channel matrix to generate a corresponding first channel matrix;
  multiplying a conjugate transpose matrix of a first matrix by the first channel matrix to obtain an equivalent channel matrix, and multiplying the conjugate transpose matrix of the first matrix by an original received signal vector to obtain an equivalent received signal vector, wherein the first matrix comprises a singular vector corresponding to singular value o of a conjugate transpose matrix of the first channel matrix, and the original received signal vector is obtained by using the receive antenna;
  calculating a Euclidean distance between the equivalent received signal vector and a first vector to obtain a Euclidean distance set, wherein the first vector is obtained by multiplying the equivalent channel matrix by a first transmit signal vector, and the first transmit signal vector is an element in a first transmit signal vector set that comprises a symbol of constellation modulation performed on a transmit signal;
  selecting at least one first transmit signal vector corresponding to at least one Euclidean distance in the Euclidean distance set, or selecting a first transmit signal vector corresponding to a Euclidean distance less than a first distance threshold, so as to constitute a selected first transmit signal vector set; and
  randomly selecting, after each group of column vectors is removed from the original channel matrix to generate a corresponding first channel matrix, and a corresponding selected first transmit signal vector set is acquired by using the first channel matrix, one vector from each first transmit signal vector set, and combining these selected vectors into a second transmit signal vector, so as to constitute a second transmit signal vector set, and detecting a transmit signal vector according to the original received signal vector, the original channel matrix, the second transmit signal vector, and the second transmit signal vector set;
wherein the receive antenna is configured to receive an original received signal and the detection apparatus is configured to perform processing on the original received signal to obtain a transmit signal.

12. The system according to claim 11, wherein performing processing on the original received signal to obtain the transmit signal comprises using a maximum likelihood estimation MLD algorithm represented by the following formula:
  wherein s is the second transmit signal vector, ŝ is a value of s that enables $\|Y-H \cdot s\|^2$ to obtain a minimum value, $\Omega$ is the second transmit signal vector set, Y is the received signal vector, H is the original channel matrix.

13. The system according to claim 11, wherein the program further includes instructions for performing singular value decomposition on the conjugate transpose matrix of the first channel matrix to obtain the first matrix.

14. The system according to claim 11, wherein each column vector group that is removed by comprises a same quantity of column vectors.

* * * * *